United States Patent [19]

Meeder, Jr.

[11] Patent Number: 4,551,765

[45] Date of Patent: Nov. 5, 1985

[54] CATHODE RAY TUBE VIBRATION ISOLATOR

[75] Inventor: Edward A. Meeder, Jr., Little Ferry, N.J.

[73] Assignee: Allied Corporation, Morris Township, Morris County, N.J.

[21] Appl. No.: 314,613

[22] Filed: Oct. 26, 1981

[51] Int. Cl.$^4$ .................................... H04N 5/645
[52] U.S. Cl. .................................... 358/248; 248/632; 358/245
[58] Field of Search .................. 220/2.1 A, 2.3 A; 358/245, 246, 248, 249, 247; 315/8; 313/482; 248/632

[56] References Cited

U.S. PATENT DOCUMENTS

| | | | |
|---|---|---|---|
| 2,169,432 | 8/1939 | Robinson | 248/632 |
| 2,354,661 | 8/1944 | Berejkoff | 358/248 |
| 2,503,813 | 4/1950 | Fisch | 358/245 |
| 3,086,078 | 4/1963 | Sharma | 358/248 |
| 3,404,227 | 10/1968 | Alcala et al. | 358/245 |
| 3,422,220 | 1/1969 | Bathelt et al. | 358/245 |
| 4,306,253 | 12/1981 | Nakamura | 358/248 |

Primary Examiner—Joseph A. Orsino, Jr.
Attorney, Agent, or Firm—Anthony F. Cuoco; Howard G. Massung; Stanley N. Protigal

[57] ABSTRACT

A cathode ray tube vibration isolator is disclosed for mounting a cathode ray tube in a display for airborne applications wherein extreme vibrations and acceleration forces are experienced, while isolating the tube from the vibrations and acceleration forces that can cause tube breakage and mechanical distortion of the shadow mask and complex electron gun assembly in color tubes that cause display degradation. Four high damped silicone base elastomeric supports are located in a plane parallel to the face of the tube, which plane passes through the center of gravity of the tube. These four supports are spaced 90 degrees apart around the tube and are fixed to both the magnetic shield of the tube and to the walls of the case in which the tube and its associated circuitry are mounted to provide vibration isolation.

5 Claims, 4 Drawing Figures

CATHODE RAY TUBE VIBRATION ISOLATOR

This invention relates to cathode ray tube vibration isolator apparatus.

BACKGROUND OF THE INVENTION

Vibration and acceleration forces experienced in aircraft have limited the use of monochromatic and shadow mask tubes. One prior art technique to overcome these problems has been to only support the front of the cathode ray tube but then flexing of the neck of the tube eventually leads to the neck of the tube breaking. Another arrangement in the prior art has been to independently suport the front and the neck of the cathode ray tube, but this has resulted in breakage of the tube where the neck begins to flare out toward the face of the tube.

In shadow mask type color cathode ray tubes, normal aircraft vibrations create mechanical distortions of the shadow mask and the complex electron gun assembly in the neck of the tube, both resulting in display degradation and color banding, which problems have not been solved and have thereby precluded the use of shadow mask type color cathode ray tubes in aircraft applications.

It is an object of my invention to provide a relatively simple arrangement for providing adequate vibration isolation mounting of both monochromatic and shadow mask color type cathode ray tubes.

It is also an object of my invention to prevent tube breakage, and to prevent mechanical distortion to shadow masks and the complex electronic gun assemblies in shadow mask type color tubes.

It is another object of my invention to provide vibration isolation mounts that require little space, are of relatively light weight, and do not interfere with the mounting of other components around the cathode ray tube.

SUMMARY OF THE INVENTION

A cathode ray tube vibration isolator is disclosed for mounting a cathode ray tube in a display for airborne applications wherein extreme vibrations and acceleration forces are experienced, while isolating the tube from the vibrations and acceleration forces that can cause tube breakage and mechanical distortion of the shadow mask and complex electron gun assembly in color tubes that cause display degradation. Four high damped silicone base elastomeric supports are located in a plane parallel to the face of the tube, which plane passes through the center of gravity of the tube. These four supports are spaced 90 degrees apart around the tube and are fixed to both the magnetic shield of the tube and to the walls of the case in which the tube and its associated circuitry are mounted to provide vibration isolation.

The invention will be better understood upon reading the following detailed description in conjunction with the drawing in which.

Figure 1:
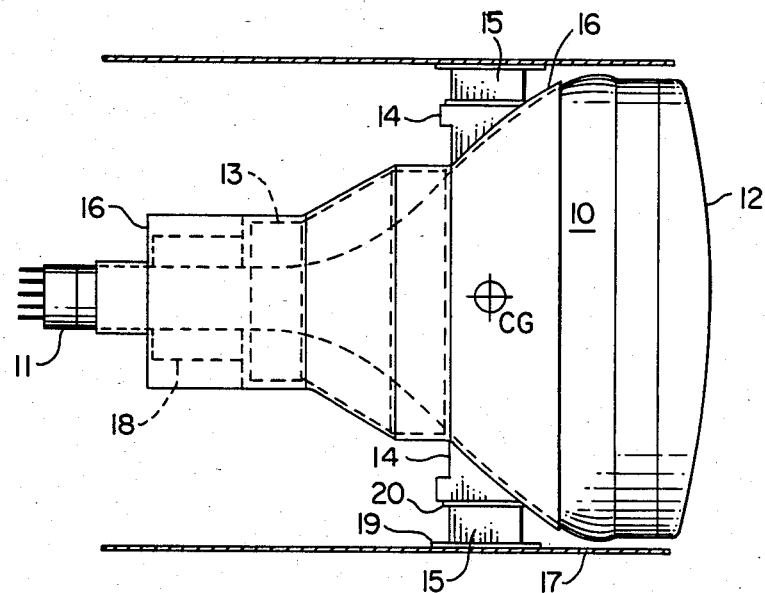
FIG. 1 is a side view of a cathode ray tube mounted within a display housing using my novel vibration isolators.

Referring to FIG. 1, cathode ray tube 10, which may be either a monochromatic tube or a shadow mask type color tube, has a neck 11 and a face 12. Mounted on neck 11 is a deflection yoke 13 and convergence magnets 18 as is well known in the art. Also shown is a magnetic shield 16 encircling the entire cathode ray tube 10. Magnetic shield 16 is shown covering only a portion of the flared end of cathode ray tube 10, but in actuality the magnetic shield 16 may extend along the surface of tube 10 all the way to face 12 as well as rearward over deflection yoke 13 and convergence magnets 18.

Magnetic shield 16 is adhesively potted to cathode ray tube 10 by a layer of silicone RTV rubber. Brackets 14 are welded or otherwise appropriately fastened to the outside of magnetic shield 16 lying in a plane both perpendicular to the tube axis and passing through the center of gravity of the tube. My novel vibration isolators 15 are fastened to both brackets 14 and housing 17 to mount tube 10 to housing 17.

Figure 2:
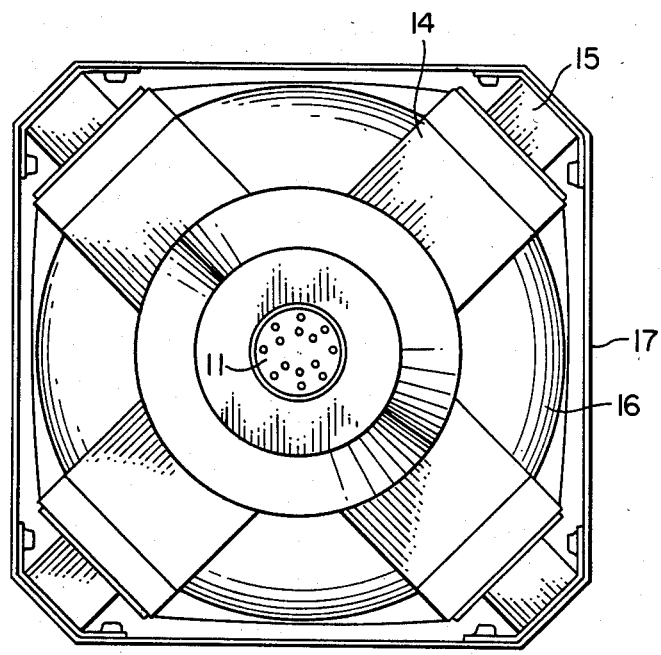
FIG. 2 is an end view showing my novel vibration isolators mounted axially around a cathode ray tube.
Figure 3:
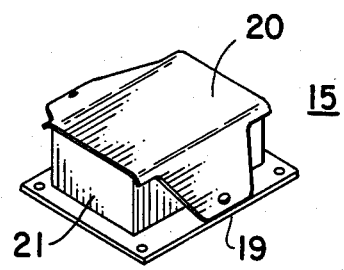
FIG. 3 is an isometric drawing of one of my novel vibration isolators.
Figure 4:
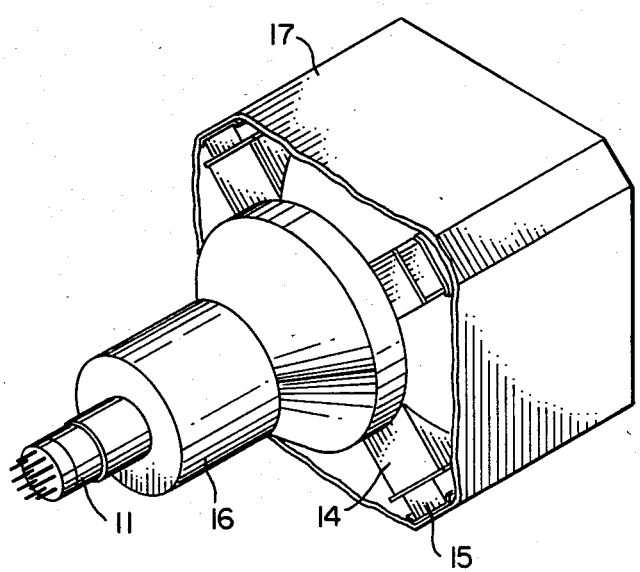
FIG. 4 is an isometric drawing of a cathode ray tube mounted within a housing, utilizing my novel vibration isolators.

The center of gravity of cathode ray tube 10 is represented by a small cross in a circle marked CG. It should be noted that brackets 14 and my novel vibration isolators 15 all lie in a plane passing through the center of gravity CG of tube 10 which plane is also perpendicular to a longitudinal axis of tube 10 passing through the neck 11 to face 12. In this embodiment of my invention the plane is parallel to face 12 of tube 10. Although not shown in FIG. 1, in the preferred embodiment of my invention there are four brackets 14 equally spaced around tube 10 and attached to magnetic shield 16. In other alternative embodiments of the invention, a different number of brackets may be fastened to shield 16. FIG. 2 shows a rear end view of tube 10 with my novel vibration isolators 15 axially spaced every 90 degrees around tube 10. FIG. 3 shows the finer details of one of vibration isolators 15 and has holes through the metal plates 19 and 20 affixed to either size of the elastomeric material. The holes are used to mount isolators 15 to housing 17 and brackets 14. FIG. 4 is an isometric drawing of what is shown basicaly in FIG. 1.

Each of vibration isolators 15 comprises metal plates 19 and 20, which each have holes therethrough for mounting purposes. Between metal plates 19 and 20 is a resilient material such as a high damped silicone based elastomer 21 having a broad temperature range and which is bonded to plates 19 and 20. Using the mounting holes through each of plates 19 and 20, each of the four vibration isolators 15 is affixed to an associated one of the four mounting brackets 14 and, in turn, is fastened to the wall of housing 17. In this manner, cathode ray tube 10 is supported at four points all lying in the plane passing ghrough the center of gravity of tube 10 is fastened to housing 17 via the silicone based elastomer of isolators 15. With this arrangement cathode ray tube 10 is supported in a manner that isolates vibrations commonly found on both military and commercial aircraft from the tube. With this mounting arrangement there are no stresses placed on neck 11 of cathode ray tube 10 which cause it to break, and the isolation of vibrations from cathode ray tube 10 prevent mechanical deformation to the complex electron gun assembly within neck 11 (not shown) and to the internal shadow mask (not shown) immediately behind face 12 of tube 10.

In an alternative embodiment of the invention the plane passing through the center of gravity CG in which the vibration isolators 15 are located is not perpendicular to the longitudinal axis of the cathode ray tube but may be at any practical angle thereto.

What is claimed is:

1. Apparatus for mounting a cathode ray tube in a housing which is subject to vibrations and to isolate the tube from the vibrations, comprising:
   a shield potted to the tube;
   a plurality of resilient means mounted to the shield external thereto and mounted to the housing, and disposed in a plane passing through the center of gravity of the tube;
   each of the plurality of resilient means including a bracket mounted to the shield and a pad mounted to the bracket and the housing; and
   each of the pads including a first and second plate having a resilient member sandwiched therebetween, with the first plate having means for mounting said first plate to a corresponding bracket and the second plate having means for mounting said second plate to the housing.

2. Apparatus as described by claim 1, wherein:
   the plurality of resilient means includes four resilient means equally spaced around the tube.

3. Apparatus as described by claim 1, wherein:
   the plane in which the plurality of resilient means is disposed is parallel to the plane of the face of the tube.

4. Apparatus as described by claim 1, wherein:
   the resilient member sandwiched between the plates is a silicon based elastomer having a relatively broad temperature range and being high damped between and bonded to the first and second plates.

5. Apparatus for mounting a cathode ray tube in a housing which is subject to vibrations and to isolate the tube from the vibrations, comprising:
   a shield potted to the tube;
   four resilient means mounted to the shield external thereto and mounted to the housing, and equally spaced around the tube, said four resilient means disposed in a plane passing through the center of gravity of the tube, said plane being parallel to the face of the tube;
   each of the four resilient means including a bracket mounted to the shield and a pad mounted to the bracket and the housing;
   each of the pads including a first and second plate and a high damped silicon based elastomer having a relatively broad temperature range sandwiched between and bonded to the first and second plates;
   the first bracket including means for mounting said plate to the bracket; and
   the second plate including means for mounting said plate to the housing.

* * * * *